(12) United States Patent
Lee et al.

(10) Patent No.: US 12,235,963 B2
(45) Date of Patent: Feb. 25, 2025

(54) PROVENANCE INFORMATION BASED TRUST EVALUATION METHOD AND APPARATUS

(71) Applicant: AJOU UNIVERSITY INDUSTRY-ACADEMIC COOPERATON FOUNDATION, Suwon-si (KR)

(72) Inventors: Seok Won Lee, Suwon-si (KR); Hyo Cheol Lee, Suwon-si (KR)

(73) Assignee: AJOU UNIVERSITY INDUSTRY-ACADEMIC COOPERATON FOUNDATION, Suwon-si (KR)

( * ) Notice: Subject to any disclaimer, the term of this patent is extended or adjusted under 35 U.S.C. 154(b) by 169 days.

(21) Appl. No.: 18/074,968

(22) Filed: Dec. 5, 2022

(65) Prior Publication Data
US 2023/0177160 A1    Jun. 8, 2023

(30) Foreign Application Priority Data
Dec. 3, 2021   (KR) .......................... 10-2021-0171954

(51) Int. Cl.
G06F 21/57         (2013.01)
(52) U.S. Cl.
CPC .................................... G06F 21/57 (2013.01)
(58) Field of Classification Search
CPC ....................................................... G06F 21/57
USPC ............................................................ 726/17
See application file for complete search history.

(56) References Cited

U.S. PATENT DOCUMENTS

| | | | | |
|---|---|---|---|---|
| 7,853,786 B1* | 12/2010 | Fultz | ..................... | H04W 4/029 |
| | | | | 726/28 |
| 8,006,100 B2* | 8/2011 | King | ..................... | G06F 21/575 |
| | | | | 713/168 |
| 8,452,962 B2* | 5/2013 | Dill | ......................... | H04L 51/08 |
| | | | | 713/181 |
| 2008/0016549 A1* | 1/2008 | Smithson | .............. | G06F 21/608 |
| | | | | 726/1 |
| 2009/0083731 A1* | 3/2009 | Sobel | ...................... | G06F 21/51 |
| | | | | 717/177 |

(Continued)

OTHER PUBLICATIONS

Lee, Hyo-Cheol et al., "Provenance information-based trust evaluation using cooperation pattern for self-adaptive systems", 2017 IEEE International Conference on Software Quality, Reliability and Security (Companion Volume), pp. 114-121.

*Primary Examiner* — Dant B Shaifer Harriman
(74) *Attorney, Agent, or Firm* — Bridgeway IP Law Group, PLLC; Sang Ho Lee; Hyun Woo Shin (57) ABSTRACT

A provenance information based trust evaluation method of a trust evaluation apparatus for selecting a cooperation object of a self-adaptive system includes transmitting a cooperation request signal to a communicable neighbor, receiving a response including provenance information from the neighbor, evaluating a final trust based on the provenance information included in the response of each cooperation candidate object by considering a neighbor which transmits the response as a cooperation candidate object, and selecting a cooperation object based on the final trust of each of the cooperation candidate object, and the final trust is calculated based on a provenance trust of each of the cooperation candidate objects and the influence of the cooperation pattern.

12 Claims, 4 Drawing Sheets

(56) References Cited

U.S. PATENT DOCUMENTS

| | | | | |
|---|---|---|---|---|
| 2011/0154010 A1* | 6/2011 | Springfield | ............ | G06F 21/57 |
| | | | | 713/150 |
| 2012/0266259 A1* | 10/2012 | Lewis | .................... | G06F 21/51 |
| | | | | 726/30 |
| 2016/0080323 A1* | 3/2016 | MacKay | ................ | H04L 41/12 |
| | | | | 726/13 |
| 2017/0293763 A1* | 10/2017 | Shear | .................... | G06F 21/316 |
| 2024/0323657 A1* | 9/2024 | Yang | .................... | G06Q 50/26 |

* cited by examiner

PROVENANCE INFORMATION BASED TRUST EVALUATION METHOD AND APPARATUS

CROSS-REFERENCE TO RELATED APPLICATIONS

This application claims the priority of Korean Patent Application No. 10-2021-0171954 filed on Dec. 3, 2021, in the Korean Intellectual Property Office, the disclosure of which is incorporated herein by reference.

BACKGROUND

Field

The present disclosure relates to a provenance information based trust evaluation method and apparatus.

Description of the Related Art

A self-adaptive system (SAS) refers to a system which detects changes in the surrounding environment and decides what action to take accordingly by itself. Currently, Internet of Things, cloud computing, and a smart grid system may be included in the self-adaptive system. The most important issue of the SAS is to understand a problem to be solved. In order to understand the problem, the SAS requires various information, such as physical information, user information, and goals as well as the desire of the user. However, the function of the system is limited so that a single system does not have sufficient information to discern the problem. In order to overcome this limitation, the system may cooperate with the other systems. During this process, it is very important to appropriately select a cooperation object corresponding to goals of the system and matters required to achieve the goals.

To this end, in order to smoothly achieve the goals of the self-adaptive system, a new technology is required to quantify the compatibility for cooperation corresponding to the goals of the system and the matters required to achieve the goals (hereinafter, referred to as requirements).

SUMMARY

An object to be achieved by the present disclosure is to provide a provenance information based trust evaluation method and apparatus which quantify a trust which is a level of a belief that a self-adaptive system behaves as expected with respect to the cooperative system to safely share information and services.

Problems to be solved by the present disclosure are not limited to the above-mentioned problem(s), and other problem(s), which is (are) not mentioned above, can be clearly understood by those skilled in the art from the following descriptions.

According to an aspect of the present disclosure, a provenance information based trust evaluation method of a trust evaluation apparatus for selecting a cooperation object of a self-adaptive system includes: transmitting a cooperation request signal to a communicable neighbor; receiving a response including provenance information from the neighbor; evaluating a final trust based on the provenance information included in the response of each cooperation candidate object by considering a neighbor which transmits the response as a cooperation candidate object; and selecting a cooperation object based on the final trust of each of the cooperation candidate object, and the final trust is calculated based on a provenance trust of each of the cooperation candidate objects and the influence of the cooperation pattern.

According to an exemplary embodiment, the provenance trust is quantified based on a cooperation result and a performance time when the cooperation is performed, and the cooperation result and the performance time are extracted from the provenance information.

According to an exemplary embodiment, the provenance trust is calculated by following Equations 1 and 2.

$$PT_j = \sum_{k}^{N}(CR_k \times \Delta t_k)/N \qquad \text{[Equation 1]}$$

Here, $PT_j$ refers a provenance trust for j, $CR_k$ refers to a k-th cooperation result, and $\Delta t_k$ refers to a time when $CR_k$ and the cooperation are performed and is calculated by Equation 2.

$$\Delta t_k = e^{-\frac{(t_{cur}-t_k)}{\lambda}} \qquad \text{[Equation 2]}$$

Here, $t_{cure}$ is a current time, $t_k$ is a time when the cooperation occurs, and $\lambda$ is a decay constant.

According to an exemplary embodiment, the influence of the cooperation pattern is calculated by different influence function formulae which are set in advance according to the type of the cooperation pattern.

According to an exemplary embodiment, a type of the cooperation pattern is classified into a consume-oriented pattern, a provide-oriented pattern, a revaluation pattern, and a devaluation pattern.

According to an exemplary embodiment, in the evaluating of a final trust, the trust evaluation apparatus determines whether to apply an influence of the cooperation pattern to an overall trust evaluation formula by a discriminant which is set in advance according to the type of the cooperation pattern.

According to an exemplary embodiment, the discriminant is defined by a ratio of information request with respect to the total number of cooperations for the consume-oriented pattern, the discriminant is defined by a ratio of information provision with respect to the total number of cooperations for the provide-oriented pattern, the discriminant is defined by a value obtained by dividing a larger one between the number of failures $N_F^{Org}$ received from a specific group for the revaluation pattern and the number of failures $N_F^{Owner}$ received from systems owned by a specific person by the total number of cooperation failure cases $N_F$, and the discriminant is defined by a value obtained by dividing a larger one between the number of successes $N_S^{Org}$ received from a specific group for the devaluation pattern and the number of successes $N_S^{Owner}$ received from systems owned by a specific person by the total number of cooperation success cases $N_S$.

According to another aspect of the present disclosure, a provenance based trust evaluation apparatus to select a cooperation object of a self-adaptive system includes: a communication module which transmits a cooperation request signal to a communicable neighbor and receives a response including provenance information from the neighbor; and a processor which executes instructions to evaluate a trust of a neighbor which transmits the response as a cooperation candidate object. When the instruction is executed, the processor is configured to evaluate a final trust based on provenance information included in the response of each cooperation candidate object and select a cooperation object based on a final trust of each of cooperation candidate objects and the final trust is calculated based on a provenance trust of each of the cooperation candidate objects and the influence of the cooperation pattern.

According to the present disclosure, according to the provenance information based trust evaluation method, a trust which needs to be considered for an operation of the self-adaptive system is quantified to allow the self-adaptive systems to select an optimal cooperation object for the operation.

By doing this, the operation of the self-adaptive system is optimized to save the driving time and the system resource.

The effects of the present disclosure are not limited to the technical effects mentioned above, and other effects which are not mentioned can be clearly understood by those skilled in the art from the following description.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Those skilled in the art may make various modifications to the present disclosure and the present disclosure may have various embodiments thereof, and thus specific embodiments will be illustrated in the drawings and described in detail in the detailed description. However, this does not limit the present disclosure within specific exemplary embodiments, and it should be understood that the present disclosure covers all the modifications, equivalents and replacements within the spirit and technical scope of the present disclosure. In the description of respective drawings, similar reference numerals designate similar elements.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

Prior to describing the present disclosure, provenance information described in the present specification may be information which is provided to the user to discern the reliability and availability of data (or big data). The provenance information may provide a history of data. The history of data may include information about a method and a procedure (or order), such as data processing, treatment, and analysis.

The provenance information may be configured by a plurality of provenance units (for example, a set of provenance units). The provenance unit may record (or store) information about the change of the most recently generated data instance. That is, the provenance unit may be a minimum unit which configures the provenance information.

The provenance unit may include data instance information, responsible party information corresponding to a data owner or manager, computational environment information providing information about a data processing environment, and a sequence of function (or process step). The function information may include a data input/output value used for the function (for example, used for mesh-up or analysis process of data).

Hereinafter, preferable embodiments according to the present disclosure will be described in detail with reference to accompanying drawings.

Figure 1:
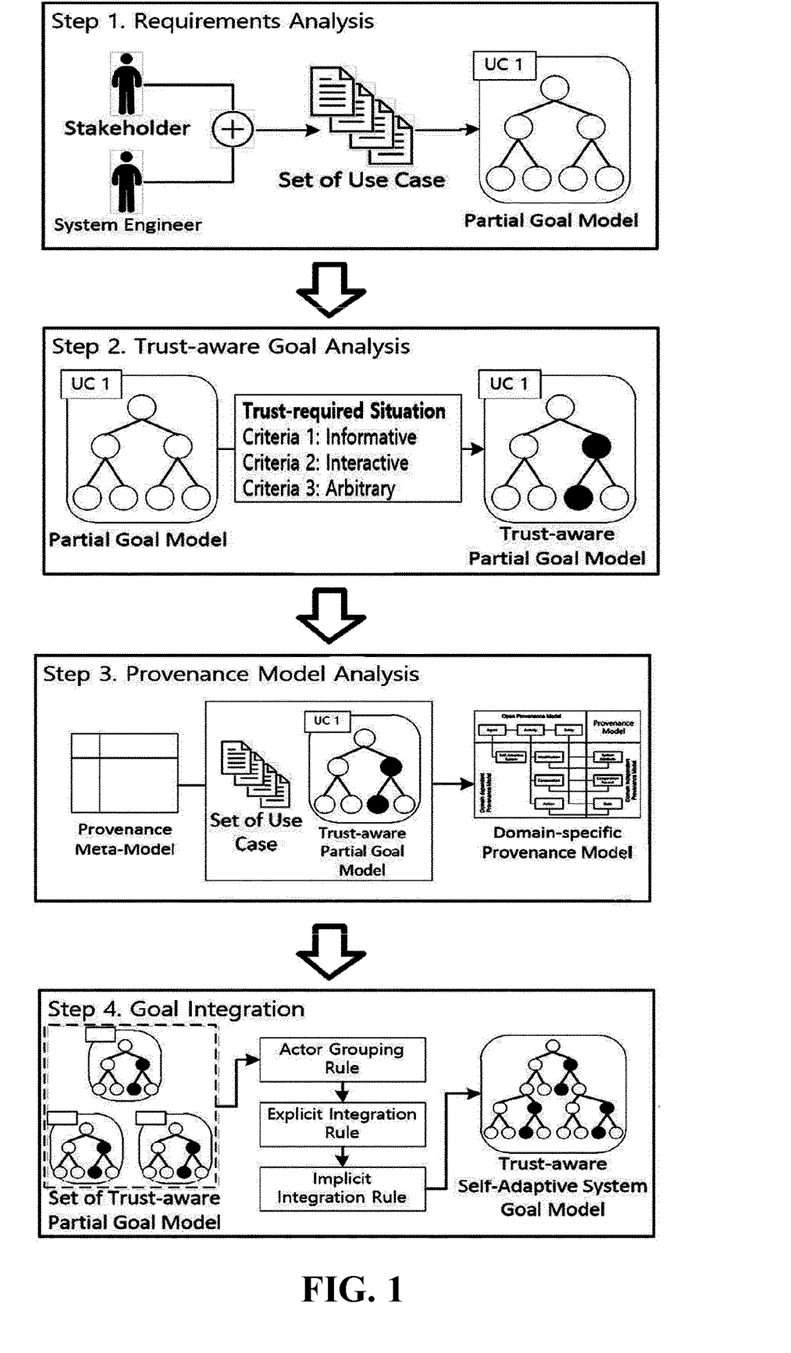
FIG. 1 is a diagram for explaining a trust requirement analysis method according to an exemplary embodiment of the present disclosure.

FIG. 1 is a diagram for explaining a trust requirement analysis method for a self-adaptive system according to an exemplary embodiment of the present disclosure.

Referring to FIG. 1, step 1 is a requirement analysis step to analyze requirements of a system according to user requirements which are well-designed to derive a goal model using a use case approach. As described above, when the goal model is derived in the use case, system requirements in view of a user may be converted into system requirements in view of a system engineer.

To this end, the system may receive a case model template as represented in Table 1 from the engineer.

TABLE 1

| Element | Description |
| --- | --- |
| Use Case Name | Unique use case name |
| Goal in Context | General goal statement of use case |
| Precondition | Prerequisite to be satisfied before starting use case |
| End Condition | Close statements after success or failure of use case |
| Primary Actor | Main stakeholder of use case |
| Trigger | The action upon the system that starts the use case |
| Description | Success scenario to describe interaction between the actor and the system |
| Extensions | Extended actions from the success scenario |
| Required Information | Information to satisfy the specific step The scenario is designed on the assumption that information exists |
| Superordinate | Name of use cases that includes this one (optional) |
| Subordinate | Name of sub-use cases (optional) |

In order to derive a goal model based on the use case template, three following goal deriving processes are performed. Three goal driving processes are a three-layer goal deriving process, an abstract goal deriving process, and a goal relationship deriving process.

The three-layer goal deriving process derives an operation goal element in three layers of 1) a use case level, 2) a user level, and 3) a system level.

The use case level is focused on a goal analyzed in a use case, the user level is focused on an action of the user to achieve the goal, and the system level is focused on a reaction of the system for the user action and a system action in a scenario which may become a system action goal instance.

The second abstract goal deriving process adds an abstract goal instance as a high level goal to associate a specific goal instance having a commonality. For example, in a payment system, a customer may make a payment with cash or a credit card to purchase a product. Each payment unit has a different payment method, but has a common feature such as checking of a bill and issuing of a receipt. Here, the system engineer may separate the commonality and the variability to combine the commonality into an extended goal instance and represent the variability as a sub-goal instance of the extended goal instance. The system engineer may define the extended goal instance to specify a group having related requirements.

In a final goal relationship deriving process, the relationship between the goal instances defined in the previous process is analyzed. The goal model may be defined as a relationship between the goal instances. As compared with the previous process which is focused on the goal case deriving, the goal relationship deriving process analyzes the relationship and classifies the relationship into two types of AND and XOR relationships. The AND relationship means that all sub goal instances need to be satisfied to achieve the higher goal instance. Since there are a specific layer and an inclusion relationship, a goal instance between different layers, such as between a use case goal and an actor goal or an actor goal and a system action goal may be applied. In contrast, the XOR relationship means that only one sub goal instance is satisfied to achieve the higher goal instance and is applied to satisfy only one goal instance between the extended goal instance and the sub goal instance.

According to this step, the system engineer may define a use case model and derive a partial goal model from each use case.

B. Step 2: Trust-Aware Goal Analysis

In the trust-aware goal analysis step, a trust goal model is defined from a general goal element by considering three criteria of the trust-required situation defined by analyzing a feature for the trust. Here, three criteria are informative, interactive, and arbitrary.

The informative means that the trust is necessary to require specific information for the system to understand the problem and derive an appropriate solution. The interactive means that the cooperation with an arbitrary system is possible. For example, information may be collected by interaction with globally certified systems such as a government system or a public system. This kind of system is considered implicitly trustworthy because the system acts for the public interest and is generally administered by governments. In contrast, arbitrary unknown system may cause a trust-related problem such as unexpected wrong information or performance which is lower than expected. Accordingly, the interactive may be confirmed by confirming whether there is an authorized information provider according to the characteristic of the information.

The system engineer verifies the trust of the goal instance by confirming whether three criterion are satisfied in each goal instance and switches the verified partial goal model into a trust-aware partial goal model.

C. Step 3: Provenance Model Analysis

Domain characteristics to which a system is applied is analyzed based on a meta model for defining a provenance model which is a trust evidence model required to quantitatively express the trust goal criterion analyzed as described above during a process of actually operating the system to define a domain-specific provenance model.

Step 4: Goal Integration

A final goal integration step is a step of deriving trust goal models which are individually derived based on each use case model as one integrated model. In this step, different trust goal models are combined based on three rules. First, models which are derived from the same user viewpoint are integrated as one model by an actor base grouping rule. Next, implicit/explicit grouping rules analyze information of use case models which are starting points of each trust goal model to connect elements whose relationship is expressed. The user requirements are analyzed by four steps to derive a new trust goal model in which the trust is considered.

Figure 2:
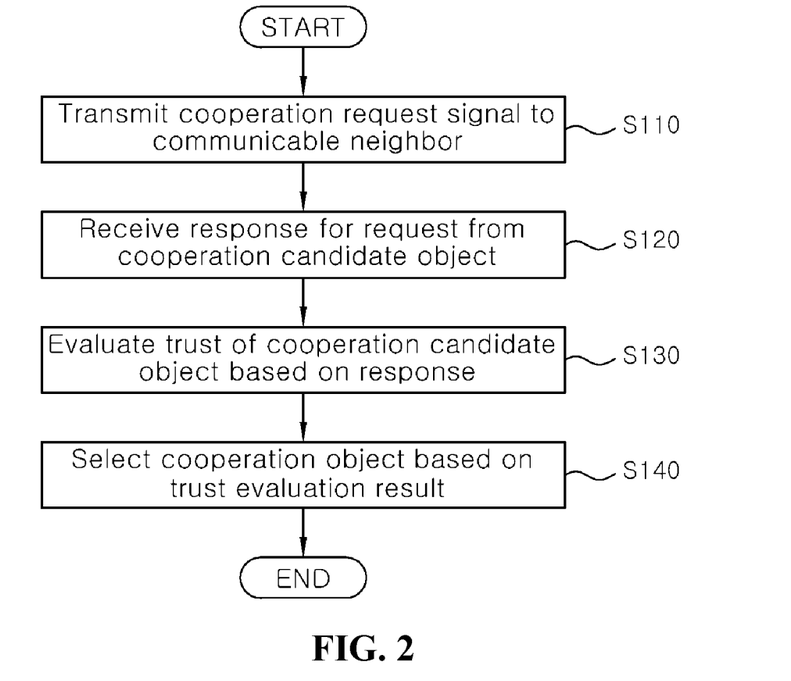
FIG. 2 is a view for explaining a provenance information based trust evaluation method according to an exemplary embodiment of the present disclosure.
Figure 3:
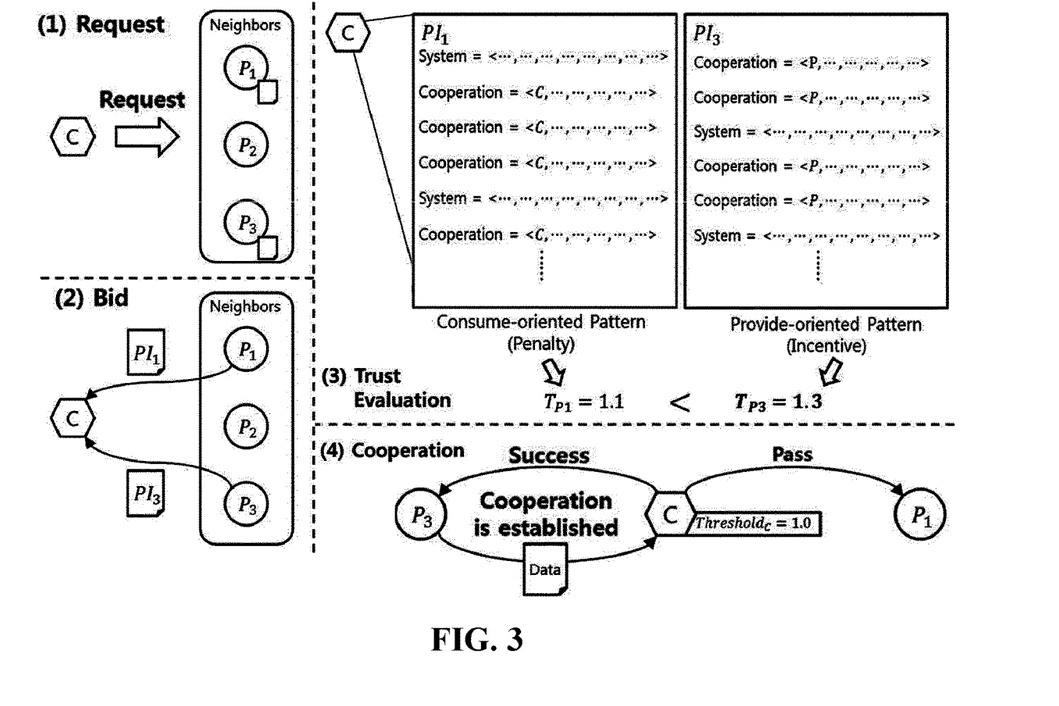
FIG. 3 is a conceptual view for explaining a provenance information based trust evaluation method according to an exemplary embodiment of the present disclosure.

FIG. 2 is a view for explaining a provenance information based trust evaluation method according to an exemplary embodiment of the present disclosure. FIG. 3 is a conceptual view for explaining a provenance information based trust evaluation method according to an exemplary embodiment of the present disclosure.

Referring to FIGS. 2 and 3, a provenance information based trust evaluation method of an evaluation apparatus requests cooperation on function/information/service to communicable neighbors $P_1$, $P_2$, and $P_3$ of the apparatus in step S110.

In step S120, a response for the request is received from a cooperation candidate object. Here, the cooperation candidate object refers to a candidate which becomes a target system or apparatus to cooperate for operation of the self-adaptive system, among neighbors requested to cooperate.

At this time, as the response, the provenance information of the cooperation candidate object is received or provenance information of the cooperation candidate object is received together with a response signal. That is, the cooperation candidate object needs to transmit the provenance information in response to the cooperation request.

In step S130, the trust of the cooperation candidate object is evaluated based on provenance information and cooperation pattern information of the cooperation candidate object which has transmitted a response.

To be more specific, in order to calculate a trust value of the cooperation candidate object, trust of the provenance information to be calculated by a previously defined Equation 1 is quantified based on the provenance information.

$$PT_j = \sum_{k}^{N}(CR_k \times \Delta t_k)/N \quad \text{[Equation 1]}$$

Here, $PT_j$ refers to a provenance trust (PT) for j, $CR_k$ refers to a k-th cooperation result (CR), and $\Delta t_k$ refers to a time when $CR_k$ and the cooperation are performed. That is, $PT_j$ refers to an average of products of the cooperation result from k to N and a performance time.

Here, a time function $\Delta t_k$ is calculated by an exponential decay function as represented in Equation 2 by considering that the influence of the cooperation result is reduced as a predetermined time elapses.

$$\Delta t_k = e^{-\frac{(t_{cur}-t_k)}{\lambda}} \quad \text{[Equation 2]}$$

Here, $t_{cure}$ is a current time and the time function $\Delta t_k$ is calculated by dividing a difference of the current time $t_{cure}$ and a time $t_k$ at which the cooperation occurs by a decay constant lambda using the exponential decay function.

The decay function lambda λ is set in advance according to an applied domain and a system i which evaluates the trust. As seen from Equation 2, the larger the decay constant lambda λ, the smaller the influence of a specific cooperation result on the trust evaluation as the time elapses and the smaller the decay constant lambda λ, the larger the influence of the specific cooperation result on the trust evaluation as the time elapses.

Finally, the overall trust is evaluated based on the calculated provenance trust PT.

The overall trust evaluation value is calculated by a product of a provenance trust PT for the cooperation candidate object j and cooperation patterns CP for j as represented in Equation 3.

$$T_{i,j} = PT_j \times \Pi CP_j \quad \text{[Equation 3]}$$

Here, $T_{i,j}$ refers to a trust for j which is evaluated by i and $CP_j$ represents an influence of a cooperation pattern CP.

The influence of the cooperation pattern is quantified by applying different influence functional formulas according to a type of the cooperation pattern.

The influence functional formula of the cooperation pattern according to the type of the cooperation pattern may be summarized as represented in Table 2.

adversely affect the overall benefit so that the consume-oriented pattern gives a penalty to the trust. In this case, the discriminant $D_c$ is defined as a ratio of information request with respect to the total number of cooperations. When a corresponding value exceeds a predetermined first reference value $\beta_c$ and the total number of cooperations $N_{comm}$ is equal to or higher than a predetermined number W, an influence function such as $$1 - \left(\frac{D_C}{2}\right)^\alpha$$

is applied. At this time, the influence varies depending on the value of the discriminant and an influence constant α may be differently defined depending on the decision of the situation/system/domain experts. The discriminant or the influence function may be defined in advance according to the domain or a system to be applied.

Next, in the cooperation results of the system, if information provision is asymmetrically more than information request, the action of the system is judged to positively affect the overall benefit so that the provide-oriented pattern gives

TABLE 2

| Name | Type | Discriminant | Functional formula |
|---|---|---|---|
| Consume-oriented | − | $D_C = \dfrac{N_{consume}}{N_{coop}}$ | $CP_{consume} = \begin{cases} 1 - \left(\dfrac{D_C}{2}\right)^\alpha & (D_C \geq \beta_C, N_{comm} \geq W) \\ 1 & \text{(others)} \end{cases}$ |
| Provide-oriented | + | $D_P = \dfrac{N_{provide}}{N_{coop}}$ | $CP_{provide} = \begin{cases} 1 + \left(\dfrac{D_P}{2}\right)^\alpha & (D_P \geq \beta_P, N_{comm} \geq W) \\ 1 & \text{(others)} \end{cases}$ |
| Revaluation | + | $D_R = \dfrac{\text{MAX}(N_F^{Owner}, N_F^{Org})}{N_F}$ | $CP_{revaluation} = \begin{cases} e^{\gamma D_R} & (D_R \geq \beta_R, N_{comm} \geq W) \\ 1 & \text{(others)} \end{cases}$ |
| Devaluation | − | $D_D = \dfrac{\text{MAX}(N_S^{Owner}, N_S^{Org})}{N_S}$ | $CP_{revaluation} = \begin{cases} e^{-\gamma D_D} & (D_D \geq \beta_D, N_{comm} \geq W) \\ 1 & \text{(others)} \end{cases}$ |

As shown in Table 2, names and types of the cooperation patterns are divided depending on the types and the cooperation patterns have different discriminants and influence functional formulae.

The cooperation pattern is applied in advance by the user according to a domain.

To be more specific, the name is an element for describing a type of the corresponding pattern and is classified into consume-oriented/provide-oriented/revaluation/devaluation.

The type is an element for distinguishing whether the pattern is positively influenced (+) or negatively influenced (−). The discriminant is an element for discerning whether the pattern needs to be applied to given trust evaluation in the current situation. If a value calculated by the discriminant exceeds a predetermined reference value, the result value by the influence function is applied to the trust evaluation result and if a value calculated by the discriminant does not exceed the predetermined reference value, the element is ignored without being applied to the trust evaluation result.

Looking at each case, in the cooperation results of the system, if information request is asymmetrically more than information provision, the action of the system is judged to an incentive to the trust. In this case, the discriminant $D_p$ is defined as a ratio of information provision with respect to the total number of cooperations. When a corresponding value exceeds a predetermined second reference value $\beta_p$ and the total number of cooperations $N_{comm}$ is equal to or higher than a predetermined number W, an influence function such as $$1 + \left(\frac{D_P}{2}\right)^\alpha$$

is applied. At this time, the influence varies depending on the value of the discriminant and an influence constant α may be differently defined depending on the decision of the situation/system/domain experts.

Next, if a collective movement to disparage the trust of the specific system is determined, the revaluation pattern supplements this to evaluate the trust. The discriminant is configured by dividing the number of failures $N_F^{Org}$ received from a specific group or the number of failures $N_F^{Owner}$ received from systems owned by a specific person by the total number of cooperation failure cases $N_F$ given to the system and the influence function is applied to be similar to the consume-oriented pattern but applies a decay function to use a function $e^{\gamma^{D_S}}$. At this time, the revaluation constant γ is used.

Next, if a collective movement to exaggerate the trust of the specific system is determined, the devaluation pattern supplements this to evaluate the trust. The discriminant is configured by dividing the number of successes $N_S^{Org}$ received from a specific group or the number of successes $N_S^{Owner}$ received from systems owned by a specific person by the total number of cooperation success cases $N_S$ given to the system and the influence function is applied to be similar to the consume-oriented pattern but applies a decay function to use a function $e^{-\gamma^{D_D}}$. At this time, the devaluation constant γ is used.

In other words, the quantified overall trust applies trust evaluation using intuitive contents of the provenance information by means of PT and identifies hidden meanings by traceable/accumulation characteristic of the provenance information to find out a hidden intention of the system, and applies the CP to more accurately evaluate the trust by considering multi-dimensional and complex aspects of the trust.

In step S140, a cooperation object is selected and a substantial cooperation is performed based on a final trust evaluation value of the cooperation candidate object and provenance information of the cooperation candidate object and the cooperation object is updated.

Figure 4:
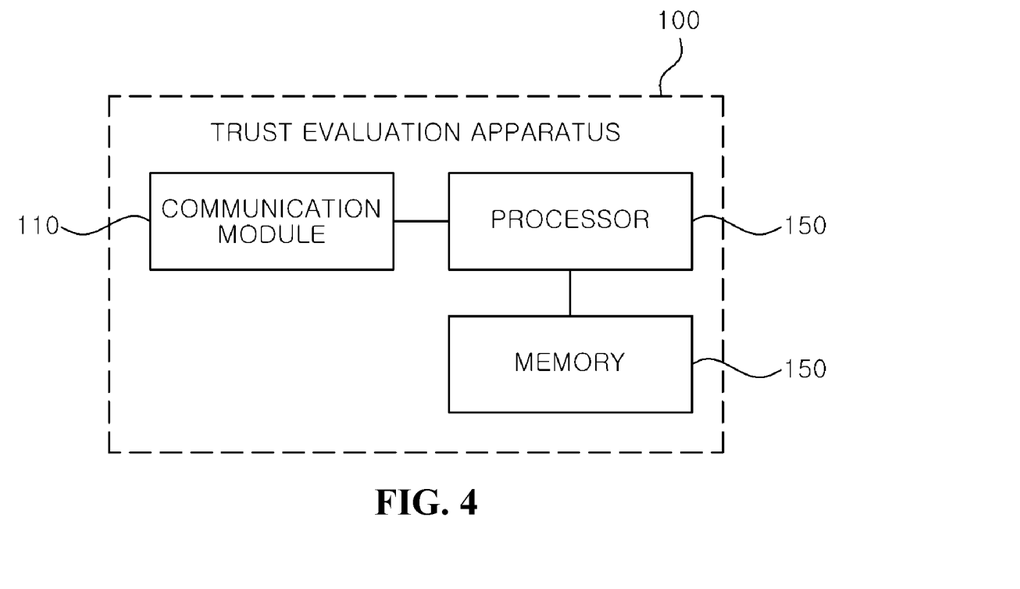
FIG. 4 is a schematic block diagram illustrating a configuration of a trust evaluation apparatus according to an exemplary embodiment of the present disclosure.
Figure 5:
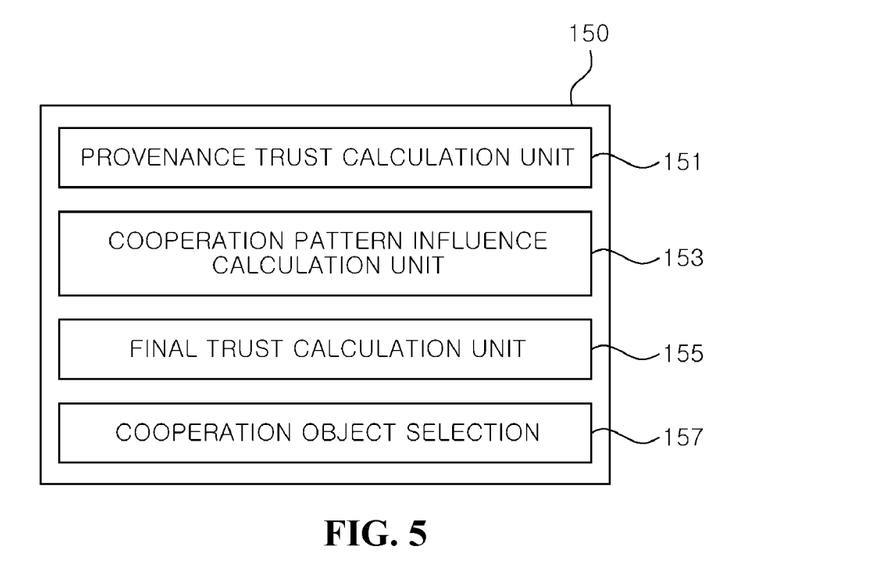
FIG. 5 is a schematic block diagram illustrating a configuration of a processor according to an exemplary embodiment of the present disclosure.

FIG. 4 is a schematic block diagram illustrating a configuration of a trust evaluation apparatus according to an exemplary embodiment of the present disclosure and FIG. 5 is a schematic block diagram illustrating a configuration of a processor according to an exemplary embodiment of the present disclosure.

The trust evaluation apparatus 100 may include a communication module 110, a memory 130, and a processor 150. However, it is not limited thereto so that other general-purpose components may be further included in the apparatus 100, as well as the components illustrated in FIG. 4.

The trust evaluation apparatus 100 may exchange signals with cooperative neighbors for the operation of the self-adaptive system via the communication module 110.

The communication module 110 transmits a cooperation request signal to a communicable neighbor and receives a response including provenance information from the neighbor.

Further, the communication module 110 may transmit the provenance information received from the neighbor to the processor 150.

The memory 130 may store instructions (or programs) which is executed by the processor 150. For example, the instructions may be instructions which allows the processor 150 to evaluate the trust of a neighbor which has transmitted the response as a cooperation candidate object.

The processor 150 may control the overall operation of the trust evaluation apparatus 100. The processor 150 may be implemented by an array of a plurality of logic gates and may be implemented by a combination of a general microprocessor and a memory in which a program executable by the microprocessor is stored. Further, the processor 150 may be configured by a plurality of processing elements.

The processor 150 may execute instructions to evaluate the overall trust of the cooperation candidate object. The instructions may be implemented (or embedded) in the processor 150. Thereafter, the processor 150 may write (or record) one or more execution results in the memory 130 or other memory (not illustrated), such as an internal register, an internal cache, or a storage.

The processor 150 may perform an operation of evaluating an overall trust of the cooperation candidate object based on information stored in the memory 130.

Referring to FIG. 5, the processor 150 may include a provenance trust calculation unit 151, a cooperation pattern influence calculation unit 153, a final trust calculation unit 155, and a cooperation object selection unit 157.

The provenance trust calculation unit 151 may quantify the trust based on a cooperation result and a performance time when the cooperation is performed, by Equations 1 and 2 described with reference to FIGS. 2 and 3. Here, the cooperation result and the performance time may be extracted from the provenance information.

The cooperation pattern influence calculation unit 153 calculates an influence by different influence functional formulae which are set in advance according to the type of the cooperation pattern.

Here, the type of the cooperation pattern may be classified into a consume-oriented pattern, a provide-oriented pattern, a revaluation pattern, and a devaluation pattern.

The cooperation pattern influence calculation unit 153 determines whether to apply the influence of the cooperation pattern to the overall trust evaluation formula by a discriminant which is set in advance according to the type of the cooperation pattern, as described in Table 2 with reference to FIGS. 2 and 3.

The final trust calculation unit 155 calculates a final trust of each cooperation candidate object based on Equation 3 with reference to FIGS. 2 and 3, based on the result of the provenance trust calculation unit 151 and the cooperation pattern influence calculation unit 153.

The cooperation object selection unit 157 selects a cooperation object based on the final trust calculated in the final trust calculation unit 155.

As described above, according to the provenance information based trust evaluation method according to the present disclosure, a trust which needs to be considered for an operation of the self-adaptive system is quantified to allow the self-adaptive systems to select an optimal cooperation object for the operation.

By doing this, the operation of the self-adaptive system is optimized to save the driving time and the system resource.

The method according to the example embodiment may be implemented as a program command which may be executed by various computers to be recorded in a computer readable medium. The computer readable medium may include solely a program command, a data file, and a data structure or a combination thereof. The program instruction recorded in the medium may be specifically designed or constructed for the example embodiment or known to those skilled in the art of a computer software to be used. Examples of the computer readable recording medium include magnetic media such as a hard disk, a floppy disk, or a magnetic tape, optical media such as a CD-ROM or a DVD, magneto-optical media such as a floptical disk, and a hardware device which is specifically configured to store and execute the program command such as a ROM, a RAM, and a flash memory. Examples of the program command include not only a machine language code which is created by a compiler but also a high level language code which may be executed by a computer using an interpreter. The hardware device may operate as one or more software modules in order to perform the operation of the example embodiment and vice versa.

The software may include a computer program, a code, an instruction, or a combination of one or more of them and configure the processing device to be operated as desired or independently or collectively command the processing device. The software and/or data may be permanently or temporarily embodied in an arbitrary type of machine, component, physical device, virtual equipment, computer storage medium, or device, or signal wave to be transmitted to be interpreted by a processing device or provide command or data to the processing device. The software may be distributed on a computer system connected through a network to be stored or executed in a distributed manner. The software and data may be stored in one or more computer readable recording media.

As described above, although example embodiments have been described by limited drawings, those skilled in the art may apply various technical modifications and changes based on the above description. For example, even when the above-described techniques are performed by different order from the described method and/or components such as a system, a structure, a device, or a circuit described above are coupled or combined in a different manner from the described method or replaced or substituted with other components or equivalents, the appropriate results can be achieved.

Therefore, other implements, other embodiments, and equivalents to the claims are within the scope of the following claims.

What is claimed is:

1. A provenance information based trust evaluation method for selecting an interaction object of a self-adaptive system, the provenance information based trust evaluation method comprising:

transmitting an interaction request signal, by a communication module, to at least one neighbor;

receiving a response including provenance information, by the communication module, from the at least one neighbor;

regarding the at least one neighbor that transmits the response as at least one interaction object candidate and evaluating a final trust of the at least one interaction object candidate based on the provenance information included in the response by a processor; and selecting an interaction object among the at least one interaction object candidate based on the final trust of each of the at least one interaction object candidate by the processor, wherein the final trust is calculated based on a provenance trust of each of the at least one interaction object candidate and an influence of an interaction pattern, wherein the provenance trust is calculated by following Equations 1 and 2:

$$PT_j = \sum_{k}^{N}(CR_k \times \Delta t_k)/N, \quad \text{[Equation 1]}$$

wherein $PT_j$ denotes a provenance trust for j, $CR_k$ denotes a k-th interaction result, and $\Delta t_k$ denotes a time when $CR_k$ and an interaction are performed, wherein $\Delta t_k$ is calculated by Equation 2:

$$\Delta t_k = e^{-\frac{(t_{cur}-t_k)}{\lambda}} \quad \text{[Equation 2]}$$

wherein $t_{cur}$ denotes a current time, $t_k$ denotes a time when the interaction occurs, and $\lambda$ denotes a decay constant.

2. The provenance information based trust evaluation method according to claim 1, wherein an interaction result and a performance time are extracted from the provenance information.

3. The provenance information based trust evaluation method according to claim 1, wherein the influence of the interaction pattern is calculated by different influence function formulae which are predetermined according to a type of the interaction pattern.

4. The provenance information based trust evaluation method according to claim 3, wherein the type of the interaction pattern is classified into a consume-oriented pattern, a provide-oriented pattern, a revaluation pattern, and a devaluation pattern.

5. The provenance information based trust evaluation method according to claim 4, wherein in the evaluating of the final trust, determining, by a trust evaluation apparatus, whether to apply the influence of the interaction pattern to an overall trust evaluation formula by a discriminant which is predetermined according to the type of the interaction pattern.

6. The provenance information based trust evaluation method according to claim 5, wherein the discriminant is defined by a ratio of information request with respect to a total number of interactions for the consume-oriented pattern, wherein the discriminant is defined by a ratio of information provision with respect to a total number of interactions for the provide-oriented pattern, wherein the discriminant is defined by a value obtained by dividing a larger one between a number of failures $N_F^{Org}$ received from a specific group and a number of failures $N_F^{Owner}$ received from systems owned by a specific person by a total number of interaction failure cases $N_F$ for the revaluation pattern, or wherein the discriminant is defined by a value obtained by dividing a larger one between a number of successes $N_S^{Org}$ received from a specific group and a number of successes $N_S^{Owner}$ received from systems owned by a specific person by a total number of interaction success cases $N_S$ for the devaluation pattern.

7. A provenance information based trust evaluation apparatus to select an interaction object of a self-adaptive system, the provenance information based trust evaluation apparatus comprising:

a communication module configured to transmit an interaction request signal to at least one neighbor and to receive a response including provenance information from the at least one neighbor; and a processor configured to execute instructions to evaluate a trust of the at least one neighbor which transmits the response, wherein when the instructions are executed, the processor is configured to evaluate a final trust based on the provenance information included in the response and select an interaction object among the at least one neighbor that transmits the response based on the final trust, and wherein the final trust is calculated based on a provenance trust of the at least one neighbor which transmits the response and an influence of an interaction pattern, wherein the provenance trust is calculated by following Equations 1 and 2:

$$PT_j = \sum_{k}^{N}(CR_k \times \Delta t_k)/N \qquad \text{[Equation 1]}$$

wherein $PT_j$ denotes a provenance trust for j, $CR_k$ denotes a k-th interaction result, and $\Delta t_k$ denotes a time when $CR_k$ and an interaction are performed, wherein $\Delta t_k$ is calculated by Equation 2:

$$\Delta t_k = e^{-\frac{(t_{cur}-t_k)}{\lambda}} \qquad \text{[Equation 2]}$$

wherein $t_{cure}$ denotes a current time, $t_k$ denotes a time when the interaction occurs, and $\lambda$ denotes a decay constant.

8. The provenance information based trust evaluation apparatus according to claim 7,
wherein an interaction result and a performance time are extracted from the provenance information.

9. The provenance information based trust evaluation apparatus according to claim 7,
wherein the influence of the interaction pattern is calculated by different influence function formulae which are predetermined according to a type of the interaction pattern.

10. The provenance information based trust evaluation apparatus according to claim 9,
wherein the type of the interaction pattern is classified into a consume-oriented pattern, a provide-oriented pattern, a revaluation pattern, and a devaluation pattern.

11. The provenance information based trust evaluation apparatus according to claim 10,
wherein the processor is configured to determine whether to apply the influence of the interaction pattern to an overall trust evaluation formula by a discriminant which is predetermined according to the type of the interaction pattern.

12. The provenance information based trust evaluation apparatus according to claim 11,
wherein the discriminant is defined by a ratio of information request with respect to a total number of interactions for the consume-oriented pattern,
wherein the discriminant is defined by a ratio of information provision with respect to a total number of interactions for the provide-oriented pattern,
wherein the discriminant is defined by a value obtained by dividing a larger one between a number of failures $N_F^{Org}$ received from a specific group and a number of failures $N_F^{Owner}$ received from systems owned by a specific person by a total number of interaction failure cases $N_F$ for the revaluation pattern, or
wherein the discriminant is defined by a value obtained by dividing a larger one between a number of successes $N_S^{Org}$ received from a specific group and a number of successes $N_S^{Owner}$ received from systems owned by a specific person by a total number of interaction success cases $N_S$ for the devaluation pattern.

* * * * *